United States Patent [19]
Arakawa et al.

[11] Patent Number: 6,142,761
[45] Date of Patent: Nov. 7, 2000

[54] OPTICAL DISC MOLDING APPARATUS

[75] Inventors: Nobuyuki Arakawa, Kanagawa; Yuji Akiyama, Tokyo; Ken Minemura, Kanagawa, all of Japan

[73] Assignee: Sony Corporation, Tokyo, Japan

[21] Appl. No.: 09/127,917

[22] Filed: Aug. 3, 1998

[30] Foreign Application Priority Data

Aug. 4, 1997 [JP] Japan .................................... 9-209224

[51] Int. Cl.[7] .................................................. B29C 45/17
[52] U.S. Cl. ......................................... 425/192 R; 425/810
[58] Field of Search ............................... 425/810, 192 R, 425/190, 451.9, DIG. 127

[56] References Cited

U.S. PATENT DOCUMENTS 5,612,062  3/1997  Takahashi ..................................... 425/3

FOREIGN PATENT DOCUMENTS

91-055589  6/1989  Japan .

Primary Examiner—Harold Pyon
Assistant Examiner—Donald Heckenberg
Attorney, Agent, or Firm—Ronald P. Kananen; Rader, Fishman & Grauer

[57] ABSTRACT

An optical disc molding apparatus is able to mold an optical disc in which the occurrence of swollen portions of trumpet shape on the upper and lower surfaces of on the outer peripheral portion of a disc base may be minimized and in which a burr may be prevented from being produced on the outer peripheral portion of the disc base. In the optical disc molding apparatus having a ring (6) for molding an outer diameter portion of a disc base and holding a stamper (5) for transfer a signal pit, a holding surface of the ring (6) for holding the stamper (5) is formed as the concave and convex surfaces comprising a plurality of concentric land portions (21) and a plurality of concentric groove portions (22). The outer peripheral surface of the stamper (5) is held by each land portion (21) with a pressure.

3 Claims, 9 Drawing Sheets

FIG. 1
PRIOR ART

PRIOR ART

OPTICAL DISC MOLDING APPARATUS

BACKGROUND OF THE INVENTION

The present invention relates to an optical disc molding apparatus used to mold a base of a disc such as an audio disc (CD (compact disc)), a video disc or the like, and more particularly relates to an optical disc molding apparatus in which an outer peripheral portion of a disk base may be protected from being deformed into a trumpet shape by improving a shape of a ring forming the outer peripheral portion of the disc base, resulting in a disc base of a high quality being obtained.

Heretofore, as optical recording media such as an audio disc, a video disc and so on for recording a variety of information, there are known optical recording media (hereinafter collectively referred to as "optical disc") for recording information by irradiation of recording or reproducing light. Such an optical disk generally includes an information recording layer. As a method of forming an information recording layer having very fine concavities and convexities such as phase bits, pregrooves and so on in which a variety of information such as data information, a tracking servo signal and so on is recorded, there has hitherto been used an injection molding method using a stamper.

Figure 1:
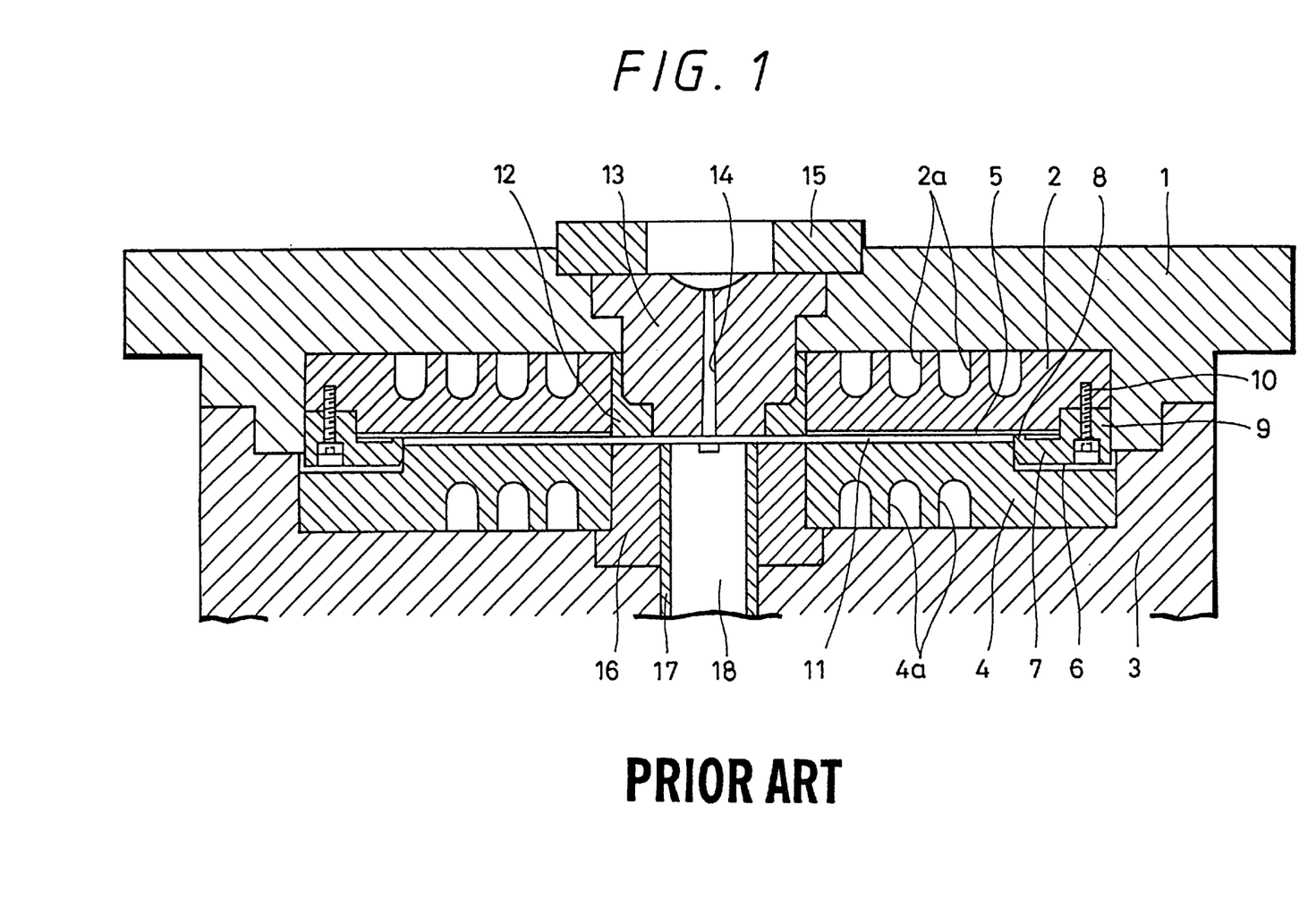
FIG. 1 is a cross-sectional view of an optical disc molding apparatus according to the prior art.

FIG. 1 of the accompanying drawings is a cross-sectional view illustrating the mold clamping state of a metal molding apparatus for molding a disc base of an optical disc. In FIG. 1, reference numeral 1 generally denotes a stationary side die. In this stationary die 1, there is assembled a stationary metal mold 2 the side of which opposes a cavity is mirror-polished. Reference numeral 3 denotes a movable die which may be moved up and down relative to the stationary die 1 along a stay, not shown. Similarly, a movable metal mold 4 the side of which opposes the cavity is mirror-polished is assembled into the movable die 3. Cooling water paths 2a, 4a are defined in the stationary metal mold 2 and the movable metal mold 4, respectively, A stamper 5 is disposed on the cavity surface side of the stationary metal mold 2 to transfer and mold a signal pit on the disc. The stamper 5 is held by a ring 6 which is served as also a metal mold for molding an outer peripheral portion of the disc.

More specifically, the ring 6 is formed such that the outer peripheral portion of the stamper 5 is urged against the cavity surface side of the stationary metal mold 2 by a land portion 8 of a convex shape formed on the upper edge of the innermost peripheral portion of an inner peripheral portion 7 of the ring 6. A thick outer peripheral portion 9 of the ring 6 is fixed to the stationary metal mold 2 by a plurality of bolts 10.

The movable die 3 is fitted into the ring 6 in such a manner that an outer peripheral surface of the movable metal mold 4 is brought in contact with the inner peripheral surface of the ring 6. Thus, the stationary metal mold 2, the movable metal mold 4 and the ring 6 constitute a molding cavity 11.

Figure 2:
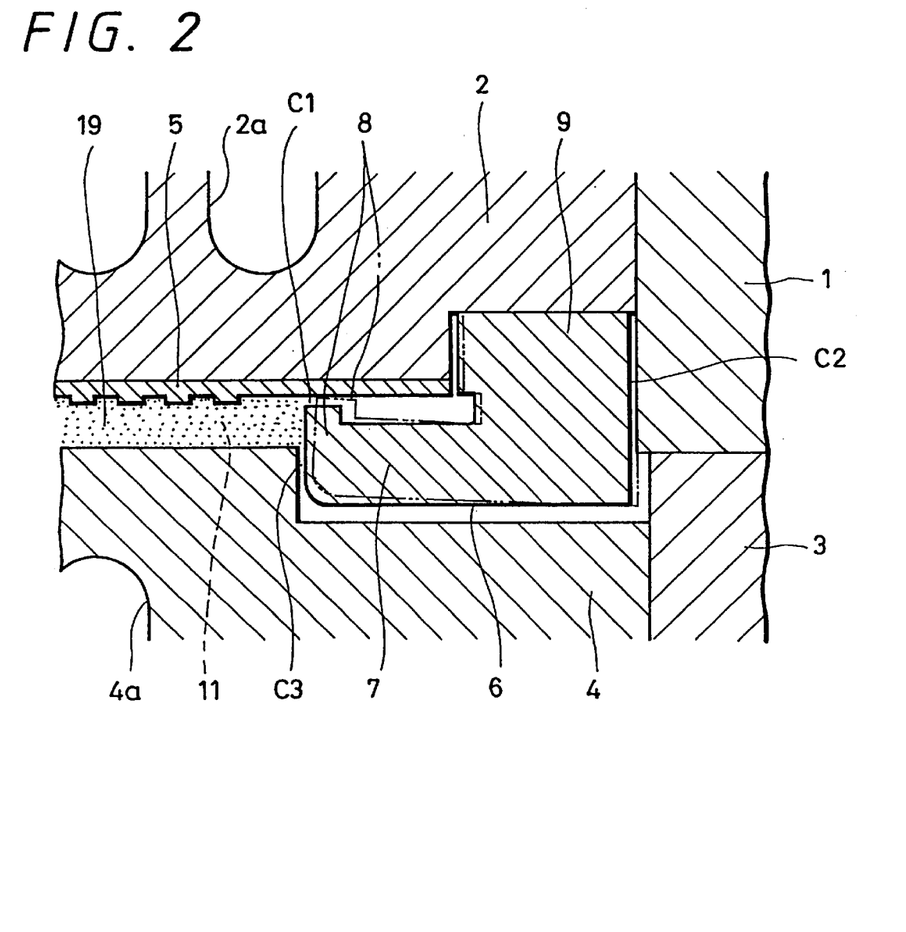
FIG. 2 is a cross-sectional view showing a ring and portions lying around the ring in an enlarged-scale.

In this clamping state, as shown in FIG. 2 in an enlarged-scale, the land portion 8 of the inner peripheral portion 7 and the stamper 5 have a clearance C1 therebetween, the outer peripheral surface of the outer peripheral portion 9 and the stationary side die 1 have a clearance C2 therebetween, and the inner peripheral portion 7 and the movable metal mold 4 have a clearance C3 therebetween, respectively. The clearances C1 and C3 are set to be such clearance values as to pass only a gas within the cavity 11 but to inhibit a molten resin filled into the cavity 11 from entering, e.g. ten or more micrometers. The clearance C2 is set to be several micrometers, for example.

On the other hand, as shown in FIG. 1, the stationary side metal mold 2 has at its center attached a sprue 13 through a sprue bush 12 from the side of the stationary die 1. This sprue 13 has at its center defined an injection orifice 14 to inject a molten resin into the above-mentioned cavity 11. In FIG. 1, reference numeral 15 designates a nozzle guide for positioning an injection nozzle (not shown) against the sprue 13.

Moreover, the movable metal mold 4 has at its center attached a sleeve 17 through a bush 16 from the side of the movable die 3. A gate-cut piston 18 is disposed within the sleeve 17.

A manner in which an optical disc is molded by this prior-art optical disc molding apparatus will be described next.

Under the condition that the injection nozzle (not shown) is positioned at the sprue 13, a molten resin is injected from the injection nozzle through the injection orifice 14 into the cavity 11 and thereby filled into the cavity 11. As the molten resin is filled into the cavity 11, a gas which is in the gaseous state within the cavity 11 is escaped from a clearance (portion of the clearance C1) formed between the ring 6 and the stamper 5 and a clearance (portion of the clearance C3) formed between the ring 6 and the movable metal mold 4 so that the outer peripheral shape of the disc is finally molded by the ring 6. Then, after a predetermined time elapsed since the filling of the molten resin has been completed, the gate-cut piston 18 is elevated so that, at the same time the gate of the injection orifice 14 is cut out, a disc center-hole is molded by the outer peripheral portion of the gate-cut piston 18.

After the disc is cooled and cured, the movable die 3 is lowered together with the movable metal mold 4 and a molded disc base is obtained.

A molten resin 19 injected into the cavity 11 is filled the cavity 11 at a high temperature (about 330° C.) with a large pressure of 1000 kg/cm² (1 ton). Due to such large filling pressure, the ring 6 which molds the outer peripheral portion of the disc base is swollen toward the outer diameter side by the amount of the clearance C2 as shown by a phantom line in FIG. 2, and in particular, the inner peripheral portion 7 of the ring 6 is buckled and deformed toward the stamper 5 side.

Figure 3:
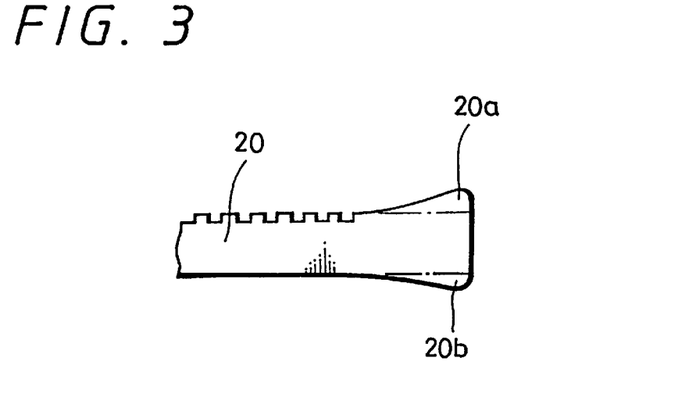
FIG. 3 is a cross-sectional view showing the manner in which a swollen portion of trumpet shape is produced on a disc base.

A stress produced in the ring 6 is a stress obtained when the ring 6 is returned to the original position after the resin pressure decreases as the resin is cooled and cured since the filling of the molten resin has been completed. A study of simulation results obtained by the assignee of the present application reveals that swollen portions 20a, 20b of a trumpet shape are produced on the upper and lower surfaces of the outer peripheral edge portion of a disc base 20 by the above stress as shown in FIG. 3. The swollen portion of the trumpet shape on the upper surface of the disc base 20, i.e. the swollen portion 20a on the signal pit side is swollen higher than the swollen portion 20b on the read-out side of the lower surface of the disc base 20.

As one of methods for preventing the ring 6 from being buckled, there may be considered a method of holding the stamper 5 with the whole surface of the inner peripheral portion 7 of the ring 6. According to this method, although the buckled and deformed state of the ring 6 due to the filling pressure may be avoided, the outer peripheral portion of the stamper 5 is pressed down completely. There is then the problem that the stamper 5 is curved toward the cavity 11 side by an amount obtained when the stamper 5 is thermally expanded by the molten resin which is at a high temperature upon injection.

Further, there is a disadvantage that a burr tends to be produced in the outer peripheral portion of the molded disc base by a stress obtained when the ring 6 is returned to the original position.

Furthermore, there arises a problem that optical of optical disc are deteriorated by a birefringence produced in the outer peripheral portion of the molded disc due to the stress obtained after the ring 6 was returned to the original position.

SUMMARY OF THE INVENTION

In view of the aforesaid aspect, it is an object of the present invention to provide an optical disc molding apparatus capable of molding an optical disc in which the occurrence of a swollen portion of trumpet shape on the outer peripheral portion of a disc base may be minimized.

It is another object of the present invention to provide an optical disc molding apparatus capable of molding an optical disc in which the occurrence of a burr on the outer peripheral portion of a disc base may be avoided.

In order to attain the aforesaid objects, according to the present invention, there is provided an optical disc molding apparatus which includes a ring for molding an outer diameter portion of a disc base on a molding metal mold and holding a stamper for molding a signal pit. In this optical disc molding apparatus, a plurality of grooves are formed on a holding surface of the ring for holding the stamper, and the outer peripheral surface of the stamper is held by the convex portion thereof.

According to the above-mentioned ring, the ring may be prevented from being buckled and deformed. As a result, a stress obtained when the ring is returned to the original position can be eliminated and the swollen portion of trumpet shape on the disc base may be minimized.

DESCRIPTION OF THE PREFERRED EMBODIMENTS

An example of the optical disc molding apparatus according to the present invention will hereinafter be described with reference to the drawings.

Figure 4:
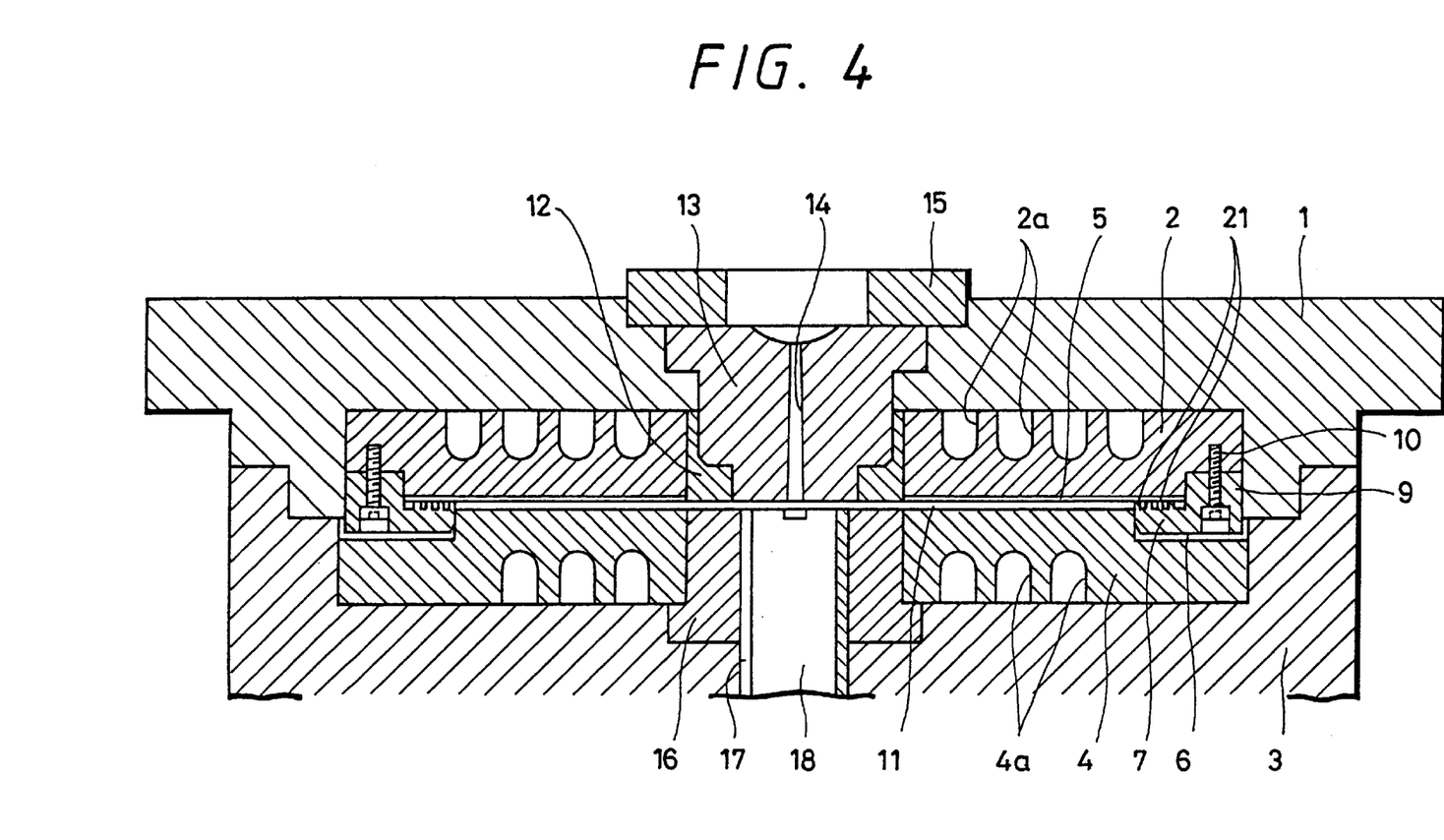
FIG. 4 is a cross-sectional view showing a clamping state of an optical disc molding apparatus according to the present invention.

FIG. 4 is a cross-sectional view illustrating the clamping state of the disc molding apparatus according to the present invention. In FIG. 4, elements and parts identical to those of FIG. 1 are marked with same reference numerals.

In FIG. 4, there is similarity with the stationary side die 1. In this stationary side die 1, there is assembled the stationary side metal mold 2 where the side which opposes the cavity 11 is mirror-polished. The movable die 3 is provided such that it may be moved up and down relative to the stationary side die 1 along a stay, not shown. Similarly, the movable metal mold 4 the side of which opposes the cavity 11 is mirror-polished and is assembled into the movable die 3. The cooling water paths 2a, 4a are defined in the stationary side metal mold 2 and the movable metal mold 4, respectively.

The stamper 5 is disposed on the cavity surface side of the stationary side metal mold 2 to transfer and mold a signal pit onto a disc. The stamper 5 is held by the ring 6 which also serves to mold an outer peripheral portion of the disc.

Figure 5A:
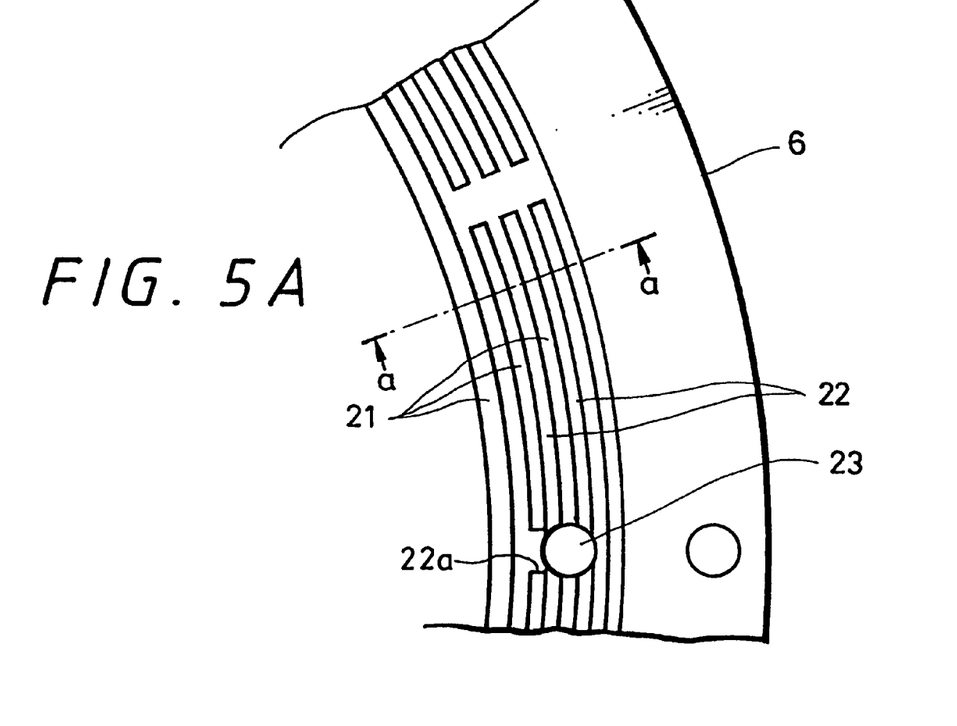
FIG. 5A is a fragmentary plan view showing a configuration of a land portion.
Figure 5B:
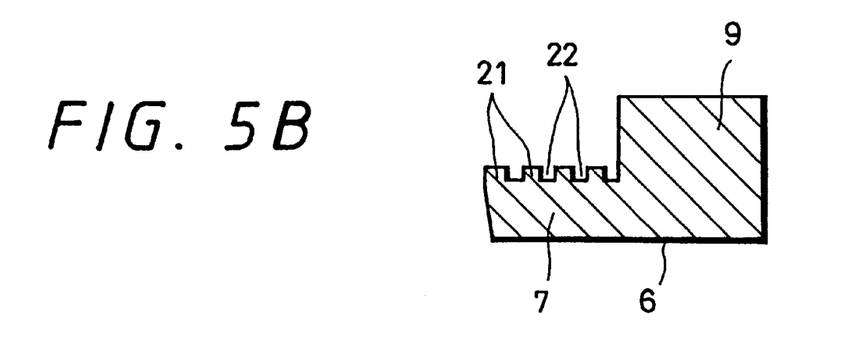
FIG. 5B is a cross-sectional view taken along the line a—a in FIG. 5A.

More specifically, the upper surface of the inner peripheral portion 7 of the ring 6 according to the present invention is formed as an irregular surface. According to this embodiment, as shown in FIGS. 5A and 5B, this irregular surface comprises a plurality of concentric land portions 21 and a plurality of concentric groove portions 22 which are formed alternately. Each groove portion 22 includes a communicating groove 22a, and this communicating groove 22a has a gas escape hole 23 defined which passes through the inner peripheral portion 7 of the ring 6. Under the condition that each land portion 21 urges the outer peripheral portion of the stamper 5 against the cavity surface side of the stationary side metal mold 2, the thick outer peripheral portion 9 was fixed to the stationary side metal mold 2 by a plurality of bolts 10.

The movable die 3 is engaged with the above-mentioned ring 6 in such a manner that the outer peripheral surface of the movable metal mold 4 is brought in contact with the inner peripheral surface of the ring 6. Thus, the stationary side metal mold 2, the movable metal mold 4 and the ring 6 constitute the molding cavity 11.

Figure 6:
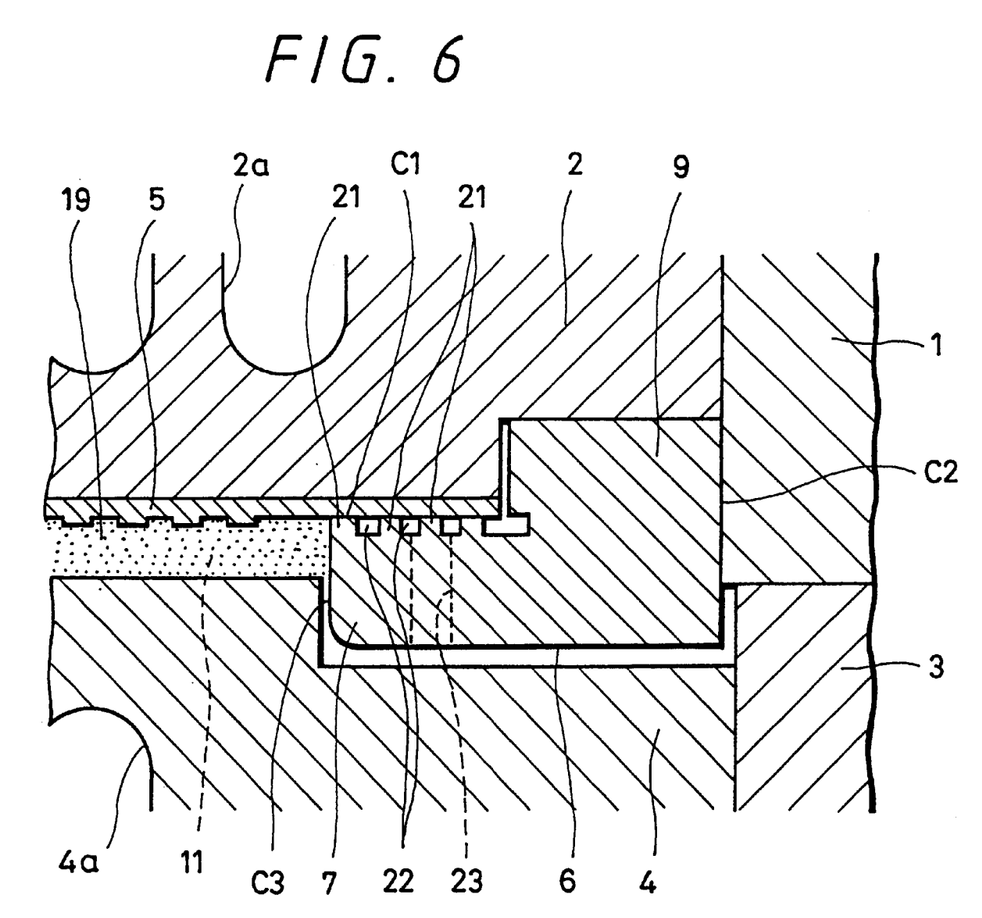
FIG. 6 is a cross-sectional view showing a ring and portions lying around the ring in an enlarged-scale.

Under this clamping state, as shown in FIG. 6 in an enlarged-scale, the ring 6 is accurately worked in such a manner that the clearance C1 is hardly produced between each land portion 21 on the inner peripheral portion 7 and the stamper 5 and they are strongly urged each other by fastening the bolts 10 firmly. Also, the outer peripheral surface of the outer peripheral portion 9 and the stationary side die 1 are closely contacted with each other in such a manner that the clearance C2 will not be produced. The clearance C3 between the inner peripheral portion 7 and the movable metal mold 4 can be ten or more. As a result, most of gas within the cavity 11 may be exhausted to the outside of the cavity 11 from the clearance C3, and the molten resin 19 filled into the cavity 11 may not enter the clearance C3.

Figure 7:
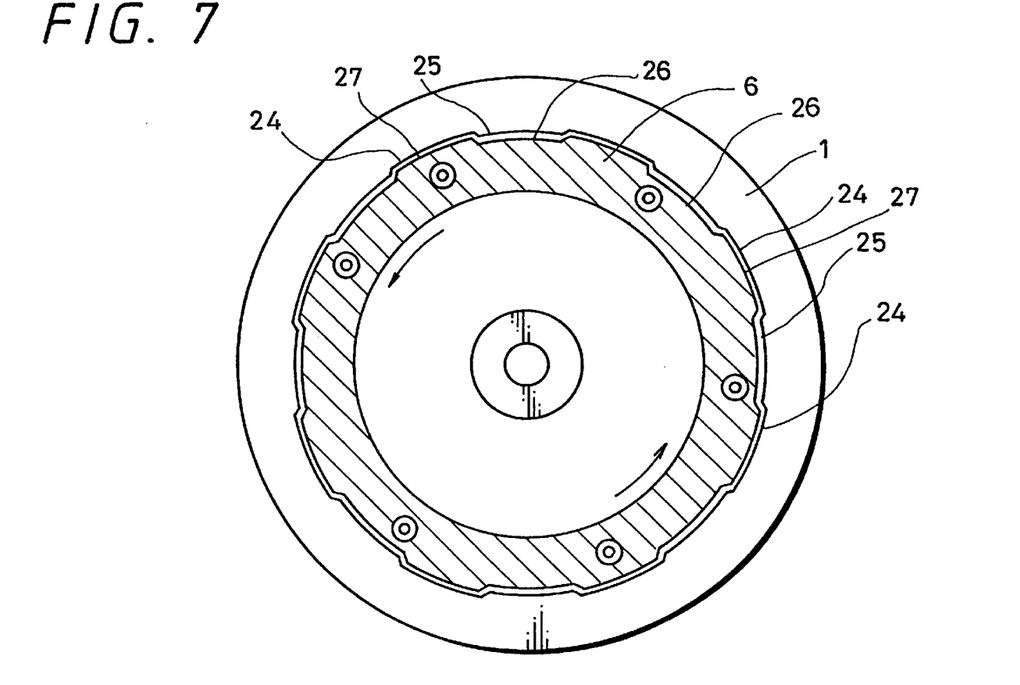
FIG. 7 is a plan view showing the state presented before the ring is engaged with the stationary side die.
Figure 8:
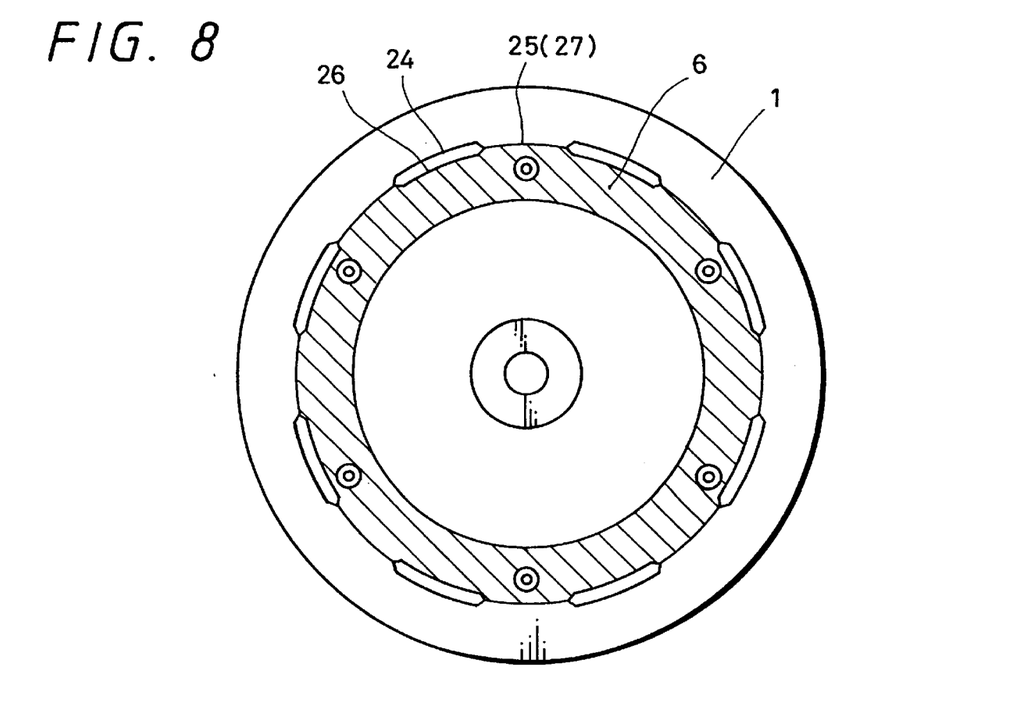
FIG. 8 is a plan view showing the manner in which the ring is engaged with the stationary side die.

On the other hand, as a method of closely contacting the outer peripheral surface of the outer peripheral portion 9 with the inner peripheral surface of the stationary side die 1 in such a manner that the clearance C2 will not be produced, according to the present invention, there is used an arrangement shown in FIGS. 7 and 8.

Figure 9A:
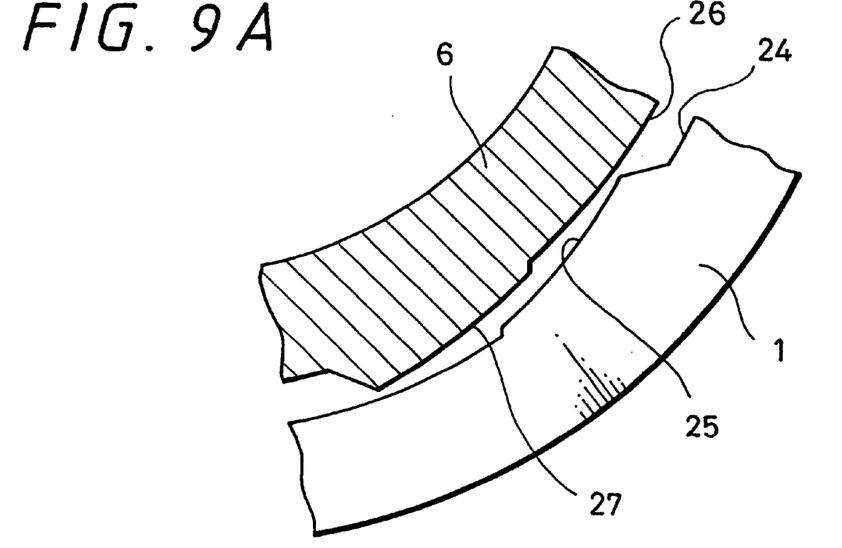
FIG. 9A is a fragmentary plan view illustrating in an enlarged-scale the state presented during the ring is being engaged with the stationary side die.
Figure 9B:
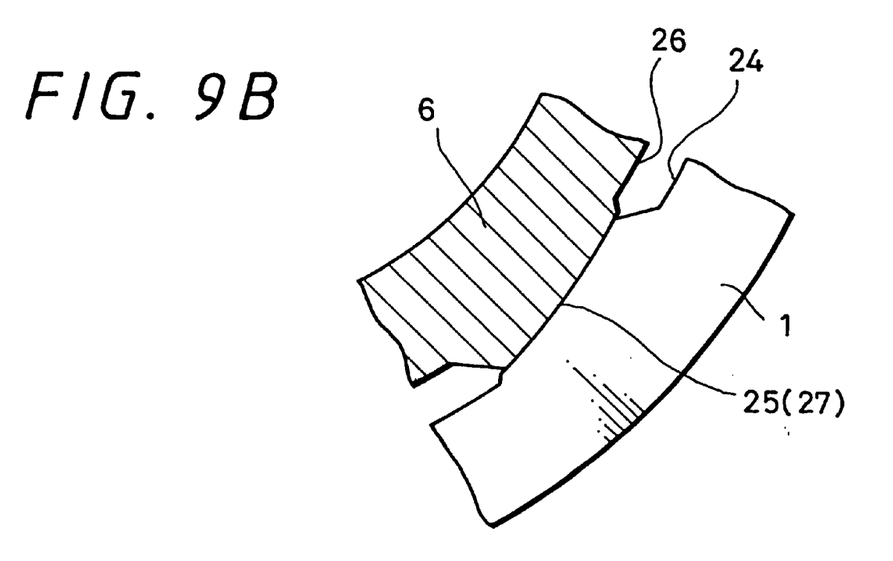
FIG. 9B is a fragmentary plan view illustrating the manner in which the ring is engaged with the stationary side die.

As illustrated in FIGS. 7 and 8, concave portions 24 are formed on the inner peripheral surface of the stationary side die 1 at an equal pitch, and the inner wall surfaces of the stationary side die 1 except the concave portions 24 are used as engagement surfaces 25. On the other hand, concave portions 26 are formed on the outer peripheral surface of the ring 6 in an opposing relation to the engagement surfaces 25 of the stationary side die 1, and outer peripheral surfaces of the ring 6 except the concave portions 26 are used as engagement surfaces 27. Then, both of the engagement surfaces 25, 27 are closely contacted with each other and thereby engaged with each other. To this end, as shown in FIGS. 9A, 9B in an enlarged-scale, both of the engagement surfaces 25, 27 are formed as wedge-like shape such that both of the engagement surfaces 25, 27 are closely engaged with each other when the ring 6 is rotated. Accordingly, the ring 6 is clamped to the inner peripheral surface of the stationary side die 1 and then fixed by the bolts 10.

Turning back to FIG. 4, the stationary metal mold 2 has at its center fixed the sprue 13 through the sprue bush 12 from the side of the stationary die 1. The sprue 13 has at its center defined the injection orifice 14 to inject the molten resin 19 into the above-mentioned cavity 11. Similarly, there is provided the nozzle guide 15 which is used to position the injection nozzle (not shown) against the sprue 13.

Moreover, the movable metal mold 4 has at its center attached the sleeve 17 through the bush 16 from the side of the movable die 3. The gate-cut piston 18 is disposed within the sleeve 17.

A manner in which an optical disc is molded by an optical disc molding apparatus according to the present invention will be described below.

Under the condition that the injection nozzle (not shown) is positioned at the sprue 13, a molten resin is injected from the injection nozzle through the injection orifice 14 into the cavity 11 and thereby filled into the cavity 11. As the molten resin is filled into the cavity 11, most of gas which is in the gaseous state within the cavity 11 is escaped from a clearance (portion of the clearance C3) formed between the ring 6 and the movable metal mold 4, and a part of gas is escaped from a clearance (portion of the clearance C1) formed between the ring 6 and the stamper 5, and exhausted through the groove portion 22 from the gas escaping hole 23. Then, finally, the outer peripheral shape of the disc is molded by the ring 6. Then, after a predetermined time elapsed since the filling of the molten resin has been completed, the gate-cut piston 18 is elevated so that, at the same time the gate of the injection orifice 14 is cut, the disc center-hole is molded by the outer peripheral portion of the gate-cut piston 18.

After the disc is cooled and cured, and the movable die 3 is lowered and released together with the movable metal mold 4 and a molded disc base is obtained.

The molten resin 19 injected into the cavity 11 is filled into the cavity 11 with a high pressure of 1000 kg/cm$^2$ (1 ton) as mentioned before. Therefore, according to the ring 6 of the optical disc molding apparatus according to the present invention, since the concentric land portions 21 formed over the whole upper surface of the inner peripheral portion 7 of the ring 6 are urged against the stamper 5 to hold the stamper 5, a filling pressure of molten resin 19 is dispersed into each land portion 21 to produce a stress. As a consequence, the inner peripheral portion 7 may be avoided from being buckled and deformed. Moreover, since the clearance between the outer peripheral portion 9 and the stationary side die 1 is removed, it is possible to prevent the ring 6 from being swollen toward the outer diameter side due to the filling pressure.

As described above, there is produced no stress when the ring 6 is returned to the original position after the disc base was molded. Accordingly, the swollen portions of trumpet shape on the upper and lower surfaces of the outer peripheral edge portion of the disc base may be minimized. Also, there may be molded a disc base in which a birefringence or a burr is difficult to be produced on the outer peripheral portion of the disc base.

Moreover, since each of the land portions 21 is urged against the stamper 5, the stamper 5 is not completely pressed but is held with a proper pressing force, thereby avoiding such a phenomenon where the stamper 5, which was thermally expanded when the molten resin was filled, is moved relative to the ring 6 with a friction and as a consequence, the stamper 5 is curved to the cavity 11 side.

Further, since the ring 6 is engaged with the stationary side die 1 in a wedge fashion when the ring 6 is rotated as the arrangement in which the ring 6 is engaged with the inner peripheral surface of the stationary side die 1 without clearance, there may be obtained the engagement state without clearance by a simple arrangement without requiring assemblies of high accuracy.

The present invention is not limited to the aforementioned embodiment and may be variously modified without departing from the gist of the present invention.

Figure 10:
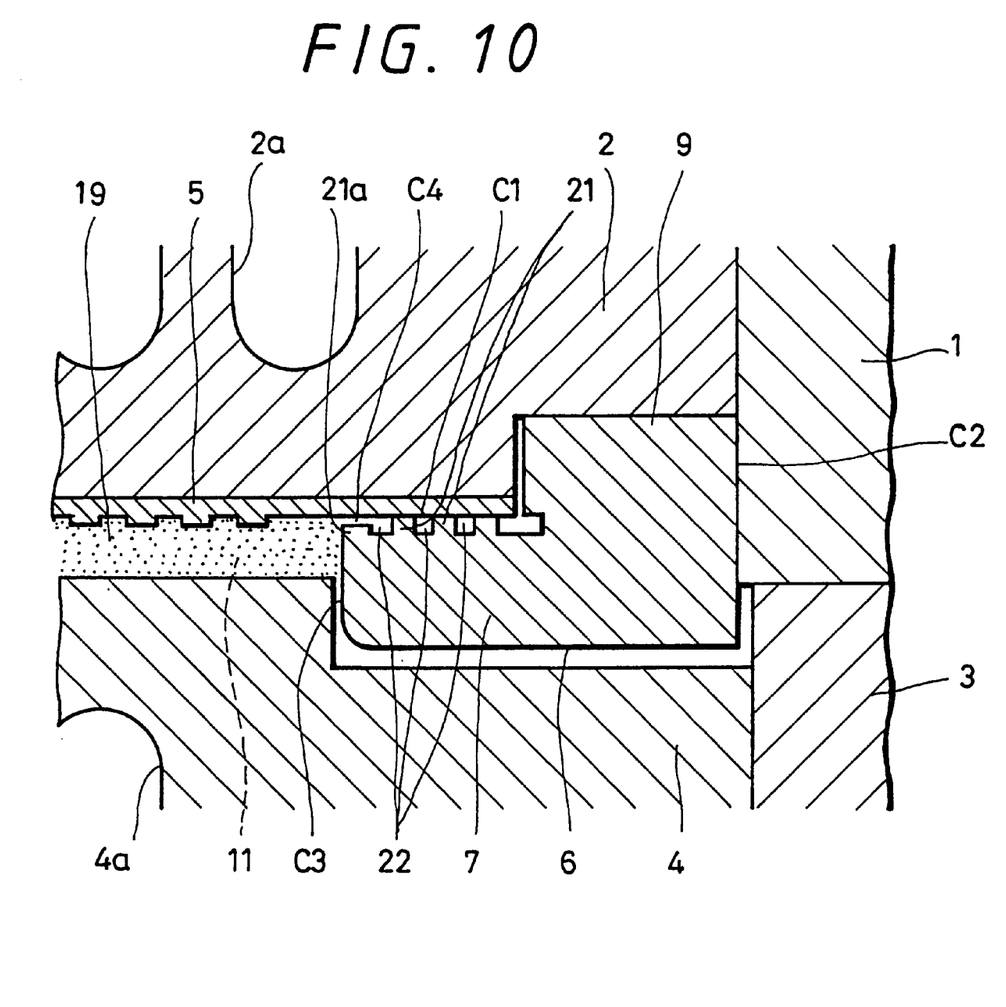
FIG. 10 is a cross-sectional view showing a ring of another land portion and portions lying around the above-mentioned ring in an enlarged-scale.

FIG. 10 shows an arrangement in which a clearance C4 of 2 to 5 μm is produced between only the innermost peripheral land portion of the ring 6 and the stamper 5 and the other land portions 21 are closely contacted with the stamper 5 similarly as described above. Thus, when the molten resin 19 is filled into the cavity 11, a gas may be effectively exhausted also from the clearance C4. In that case, since the clearance C4 lies in a range of from 2 to 5 μm, a burr may be prevented from being produced on the disc base.

Figure 11A:
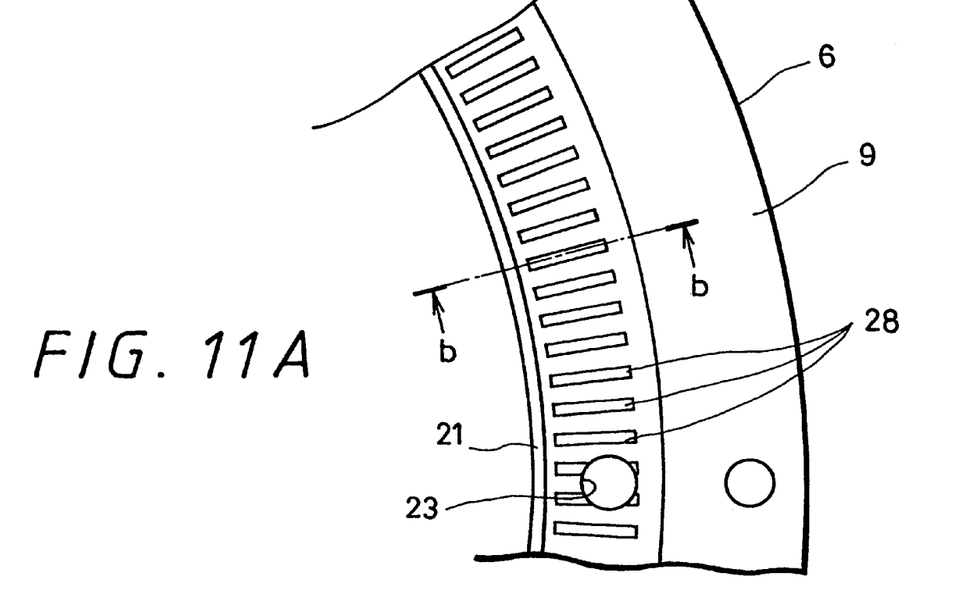
FIG. 11A is a fragmentary plan view showing a further modified example of the land portion.
Figure 11B:
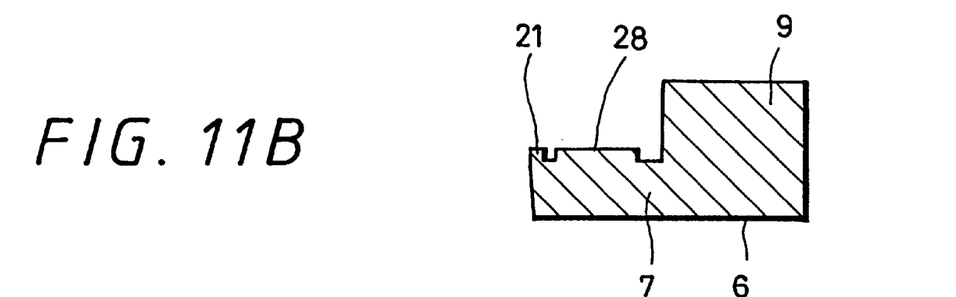
FIG. 11B is a cross-sectional view taken along the line b—b in FIG. 11A.

Further, the shape of the land portion is not limited to the concentric shape, and may be a spiral land portion. In addition, as shown in FIGS. 11A and 11B, if the inner most peripheral land portion may be left as the concentric land portion 21 and other remaining land portions 28 may be formed as land portions which are arrayed radially, then the supporting function of the stamper 5 may be obtained similarly as described above.

Furthermore, the disc base molded by the optical disc molding apparatus according to the present invention is suitably applied to a disc base of a CD, a DVD, a DVD-ROM and so on or the optical disc molding apparatus of the invention is suitably applied to a molding apparatus for molding a disc base such as a disc base of a next-generation mass-storage optical disc which will be commercially available in the near future or the like.

As described above, according to the optical disc molding apparatus of the present invention, in the ring for molding the outer peripheral portion of the disc and which also serves to hold the stamper, a plurality of concave and convex surfaces are formed on the holding surface thereof for holding the stamper and the outer peripheral surface of the stamper is held by the convex surface, whereby the occurrence of the swollen portions of trumpet shape on the upper and lower surfaces of the outer peripheral edge portion of the disc base may be minimized. In addition, there may be molded a disc base in which a birefringence or a burr is difficult to be produced on the outer peripheral portion of a disc base.

Furthermore, since each land portion is urged against the stamper, the stamper may be held with a proper pressing force. Thus, when the molten resin is filled into the cavity, the stamper may be prevented from being curved to the cavity side.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical disc molding apparatus comprising:

a pair of dies movable side in a relative fashion;

a pair of metal molds for forming a cavity therebetween;

a stamper for transferring an information pit on a disc; and a ring attached to said metal molds, having a holding surface for holding said stamper, said holding surface having a plurality of grooves and holding an outer peripheral surface of said stamper with convex surfaces of said grooves and molding an outer peripheral surface of said disc;

wherein said ring is urged against an inner diameter surface of a metal mold to which an outer diameter surface of said ring is attached in such a manner that said ring and said inner diameter surface have no clearance produced therebetween;

wherein one of said dies has on its one inner peripheral surface formed concave and convex portions, said ring has on its outer peripheral surface formed concave and convex portions and said ring is attached to said die and said metal mold by engaging said concave and convex portions with each other.

2. An optical disc molding apparatus as claimed in claim 1, wherein said convex and concave portions are formed to be a wedge shape.

3. An optical disc molding apparatus as claimed in claim 1, wherein said ring is disposed among said dies, metals molds, and stamper.

* * * * *